United States Patent [19]
Zedekar et al.

[11] Patent Number: 5,173,797
[45] Date of Patent: Dec. 22, 1992

[54] ROTATING MIRROR OPTICAL SCANNER WITH GROOVED GREASE BEARINGS

[75] Inventors: Stanley Zedekar, Corona; Kevin E. Jones, Redondo Beach; Vinod Mirchandani, Calabasas, all of Calif.; Vittorio Castelli; Robert Kleckner, both of Yorktown Heights, N.Y.

[73] Assignee: Xerox Corporation, Stamford, Conn.

[21] Appl. No.: 521,310

[22] Filed: May 8, 1990

[51] Int. Cl.$^5$ .............................................. G02B 26/08
[52] U.S. Cl. ..................................... 359/212; 359/216; 310/90.5; 384/110; 384/123
[58] Field of Search ............... 359/212, 216, 217, 218, 359/219; 310/90, 90.5; 384/100, 110, 112, 113, 123; 252/37.2

[56] References Cited

U.S. PATENT DOCUMENTS

| | | | |
|---|---|---|---|
| 3,883,439 | 5/1975 | Bergeron | 252/37.2 |
| 4,043,612 | 8/1977 | Orcutt | 384/110 |
| 4,342,050 | 7/1982 | Traino | 358/256 |
| 4,355,859 | 10/1982 | Herloski et al. | 372/24 |
| 4,355,860 | 10/1982 | Lavallee et al. | 359/217 |
| 4,397,521 | 8/1982 | Antos et al. | 359/217 |
| 4,443,043 | 4/1984 | Yamaguchi | 310/90.5 |
| 4,523,800 | 6/1985 | Yamashita et al. | 359/200 |
| 4,573,807 | 3/1986 | Asada et al. | 384/100 |
| 4,609,251 | 9/1986 | Nakaoka et al. | 359/250 |
| 4,623,216 | 11/1986 | Sato et al. | 359/200 |
| 4,691,998 | 9/1987 | Sakagaito et al. | 359/855 |

FOREIGN PATENT DOCUMENTS

| | | | |
|---|---|---|---|
| 660755 | 4/1963 | Canada | 384/123 |
| 13049 | 2/1977 | Japan | 384/123 |

OTHER PUBLICATIONS

E. A. Muijderman et al., "Grease-Lubricated Spiral-Groove Bearings", Philips Technical Review, vol. 39, No. 6/7, pp. 184-198, 1980.

Bos, "Spiral-Groove Bearing Systems with Grease", Philips Technical Review, vol. 35, No. 5, pp. 137-141, 1975.

Primary Examiner—Loha Ben
Attorney, Agent, or Firm—William Propp

[57] ABSTRACT

An optical scanner has grease bearings between the rotor and the housing. The grease bearings are grooved which tends to pump the grease back into the bearing cups when the optical scanner is operating. The thixotropic property of the grease prevents its escape from the bearing cups when the optical scanner is not operating. The grease bearings can be frusto-conical or spherical in shape with complementary shaped bearing cups. The bearing cups, rather than the bearings, may be grooved. The bearing cups may also be stepped to provide a pumping region and a reservoir region for the grease. Pressure means within the scanner housing may force the bearing cups onto the grease bearing.

16 Claims, 4 Drawing Sheets

ROTATING MIRROR OPTICAL SCANNER WITH GROOVED GREASE BEARINGS

BACKGROUND OF THE INVENTION

The present invention relates to optical scanners in general and more particularly to optical scanners employing grooved grease bearings.

Laser printers use a rotating polygon mirror optical scanner to produce the latent image on the photoreceptor. The polygon mirror is typically supported by a rotor, which is driven at a high angular velocity by an electric motor. The motor/polygon mirror assembly used in high volume/high resolution printers must operate at speeds from 15,000 to 35,000 RPM for 15,000 hours, produce little audible noise, be contamination free and survive occasional shock loading.

Conventional ball bearings can not survive at the high speeds of an optical scanner. They are extremely noisy, particularly in comparison to the quiet office environment that most optical scanners and laser printers operate in. Additionally, ball bearings at high speeds suffer from run-out, deviation from the desired spin axis, which is unacceptable for the delicate beam alignment needed for optical scanning.

Gas bearings are normally used in high speed optical scanners. They rely on the pressure created between a pair of cylindrical surfaces in relative motion to support the rotor load. One solid cylindrical surface, typically part of the rotating polygon mirror, is within a complementary stationary hollow cylindrical surface, typically part of the motor and scanner housing. One of the two cylindrical surfaces is usually grooved.

Since the gas in the gas bearing is typically air, which has a notoriously low viscosity, the clearance space between the rotating part of the bearing and the stationary part of the bearing is quite small, on the order of 3.5 microns (0.000 135 inch) with a latitude of +/−0.25 micron (0.000 010 inch). This small manufacturing latitude makes gas bearings both expensive to make and sensitive to contamination and moisture.

Furthermore, the lifetime of gas bearings is limited by the wear of the bearing surfaces rubbing together when the optical scanner is started and stopped. The cylindrical surfaces touch at rest and static friction must be overcome before the polygon mirror rotates. The friction and surface rubbing also limits the minimum rotational speed at which the gas bearings can be used. The wear, static friction and minimum speed problems are compounded when the rotor is horizontally oriented.

It is an object of this invention, therefore, to provide high-speed, long-life, reduced noise, shock-resistant bearings for optical scanners.

It is another object of this invention to provide an optical scanner which can operate in any angular orientation and at any rotational speed, is not effected by static friction and can be started and stopped without concern for the wear of the bearing surfaces.

It is another object of this invention to provide a high speed scanner with bearings that are simple and inexpensive to manufacture.

SUMMARY OF THE INVENTION

According to this invention, an optical scanner has a motor/polygon mirror assembly within the scanner housing. The mirror assembly is mounted on a rotatable rotor. Grease bearings at the end of the rotor with opposing bearing cups in the scanner housing are the only points of contact between the rotating motor/polygon mirror assembly and the housing.

The grease bearings are grooved which tends to pump the grease back into the bearing cup. The thixotropic property of the grease prevents its escape when the optical scanner is not operating. The grease bearings can be frusto-conical or spherical in shape with a complementary shaped bearing cup.

The bearing cup, rather than the bearings themselves, may be grooved. The bearing cup may also be stepped to provide a pumping region and a reservoir region for the grease. Pressure means within the scanner housing may force the bearing cup onto the grease bearing.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
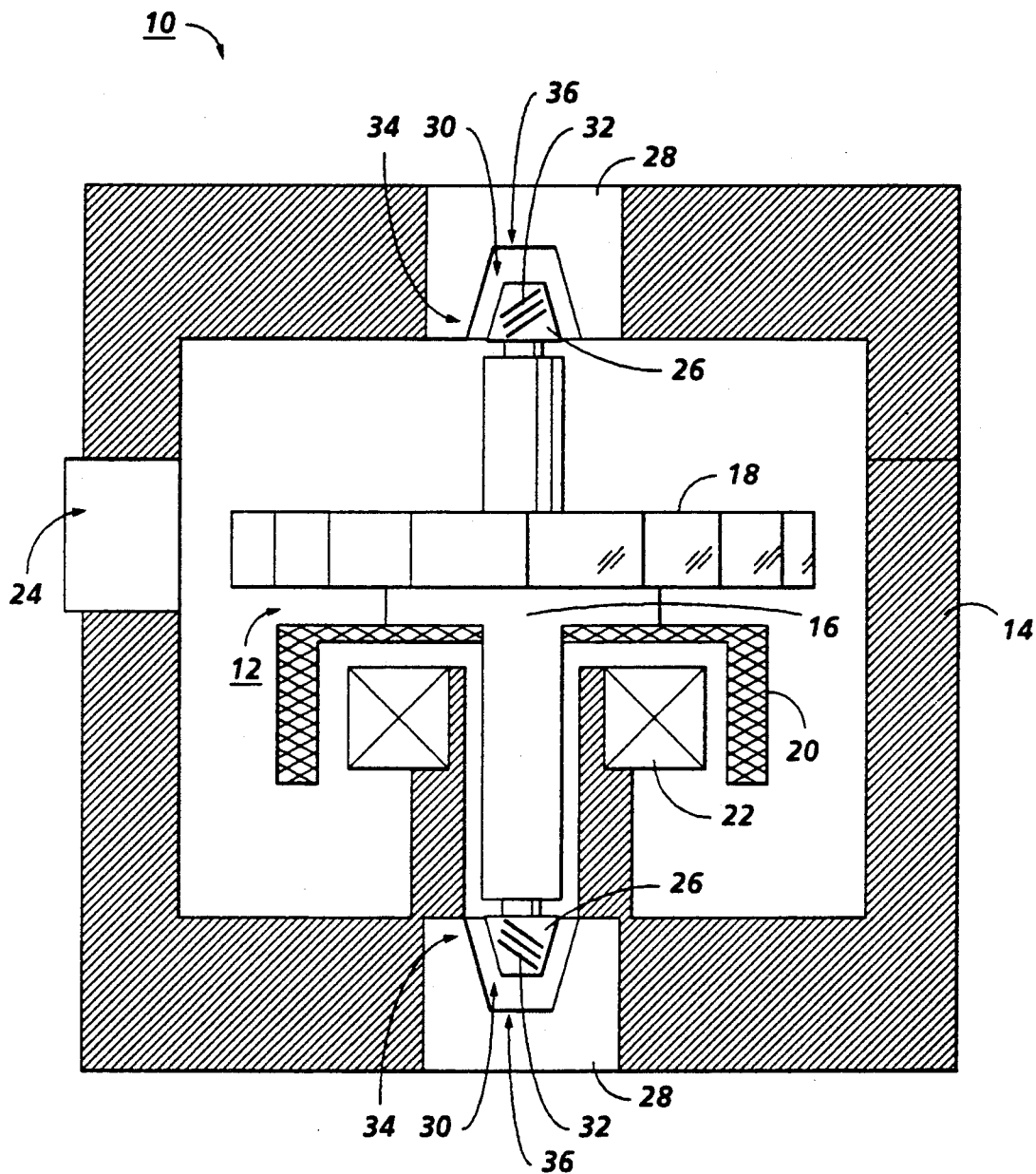
FIG. 1 is a schematic illustration of a side elevation of an optical scanner with frusto-conical grooved grease bearings formed according to this invention.

Reference is now made to FIG. 1 wherein there is disclosed an optical scanner 10 consisting of a motor/polygon mirror assembly 12 inside a scanner housing 14. The motor/polygon mirror assembly has a rotor 16 upon which is mounted a faceted polygon mirror 18 and a magnetic yoke 20. A stator coil 22 mounted in the scanner housing opposes the magnetic yoke to form the motor. Power supplied to the stator coil produces an electromagnetic field which rotates the magnetic yoke of the rotor and thus rotates the attached polygon mirror. A window 24 in the housing faces the polygon mirror so that light reflected from the rotating mirror passes through the window.

A bearing 26 is provided at both ends of the rotor to allow the motor/polygon mirror assembly to rotate. Each bearing is frusto-conical in shape. Complementary frusto-conical shaped bearing cups 28 in the housing oppose respective bearings. It is preferred that the bearings be formed integral with the rotor and the bearing cups be formed integral with the scanner housing to allow for more precise alignment and fitting. Alternately, the bearings and bearing cups can be formed separately and attached to the rotor and scanner housing, respectively, by adhesive or other means.

The small space or clearance 30 between the ends and sides of the bearing and the bearing cup is filled with grease. The grease bearing 26, the grease in the clearance 30 and the bearing cup 28 are the only points of contact between the motor/polygon mirror assembly 12 and the scanner housing 14.

The conical surface of the grease bearings 26 have a series of grooves 32. Alternatively, a spiral-shaped groove may be used instead of the series of grooves. The grooves may have a variety of cross sections, rectangular, semi-circular or v-shaped for example.

The grooves are angled forward toward the outer edge 34 of the bearing cup in the direction of rotation of the motor/polygon mirror assembly. The grooves of the bearing tend to pump the grease back into the bearing cup toward the base 36 of the cup. In the view shown in FIG. 1 the rotor and polygon mirror rotate to the left and the grease is pumped to the right and toward the bearing cup base.

Thus the grease is captured within the clearance between the bearing and the bearing cup and cannot escape from the bearing cup during operation of the optical scanner. The thixotropic property of the grease prevents its escape from the bearing cup when the optical scanner is not operating. The grease is commercially available.

The pumping property of the grooved cone while in operation and the thixotropic property of the grease while the scanner is at rest permit the optical scanner to operate at any angular orientation, not just when the rotor is vertical.

It is well known that the base oil contained within the grease acts as a lubricant. This lubricating action reduces the starting and stopping wear of the bearing surfaces to such a point that this wear is no longer of concern. The base oil lubrication also reduces the static friction to be overcome before the polygon mirror rotates. The minimum rotational speed of the grease bearing optical scanner is less than that of a comparable gas bearing optical scanner. The grease in the grease bearings also provide a cushion so that the optical scanner can survive substantial shock loading.

The viscosity of grease is approximately four to five orders of magnitude greater than the viscosity of air. Well known hydrodynamic theory predicts that the radial clearance between the bearing and the bearing cup in grease lubricated bearings can be approximately ten times larger than the clearance between the bearing and the bearing cup in an equivalent gas bearing. The radial clearance is determined by the cone angle and the amount of axial play in the system when it is ungreased. For example, the axial play is about 150 microns (0.006 inch). Radial clearance for a 10° cone angle is 12.5 microns (0.0005 inch).

Manufacturing latitudes of the grease bearings are also approximately an order of magnitude greater than those required by the gas bearing counterparts. Grease bearings are also cheaper by a tenfold factor than gas bearings and simpler to manufacture.

The bearings and cups can be made from metals or polymers. Because the design tolerances are generous, injection molding process can be used to construct parts which otherwise would require ultra-precision machining.

The surface area of the grease exposed to the atmosphere in the grease bearing is less than the surface area exposed to the atmosphere in a ball bearing. The hydrodynamic grease bearing contains approximately 0.1 to 0.01 times less the amount of grease contained in a ball bearing, thus lessening the possibility of contamination of the optical surfaces of the mirror and window by grease.

An optical scanner with grease bearings can operate over a wide range of speeds and has a long lifetime of over 100,000 hours.

Figure 2:
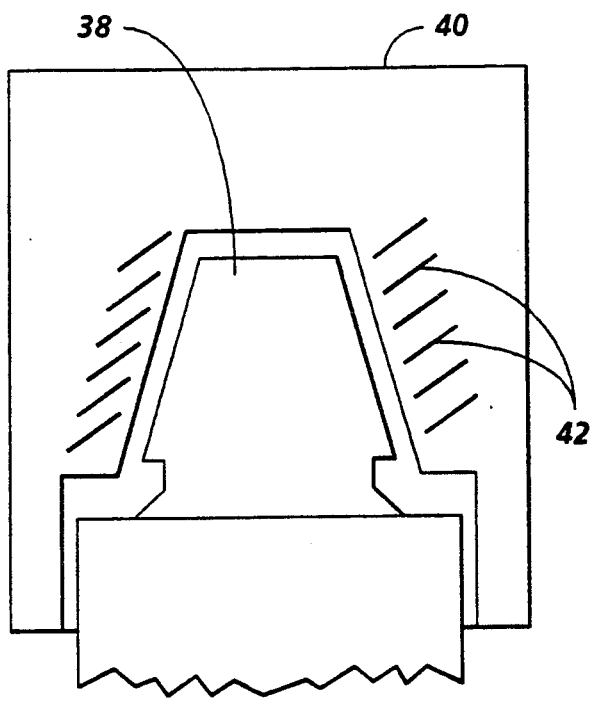
FIG. 2 is a schematic illustration of an alternate embodiment of the frusto-conical grease bearings with a grooved bearing cup formed according to this invention.

In FIG. 2, grease bearing 38 and bearing cup 40 are of identical structure to those of optical scanner 10 of FIG. 1, except that the bearing cup has a series of grooves 42. The grooves are angled forward in the direction of rotation of the motor/polygon mirror assembly so that the grooves of the bearing cup tend to pump the grease back into the bearing cup. Alternatively, a spiral-shaped groove may be used instead of the series of grooves. The grooves may have a variety of cross sections, rectangular, semi-circular or v-shaped for example. Also in the alternative, both the bearing and the bearing cup may have grooves.

Figure 3:
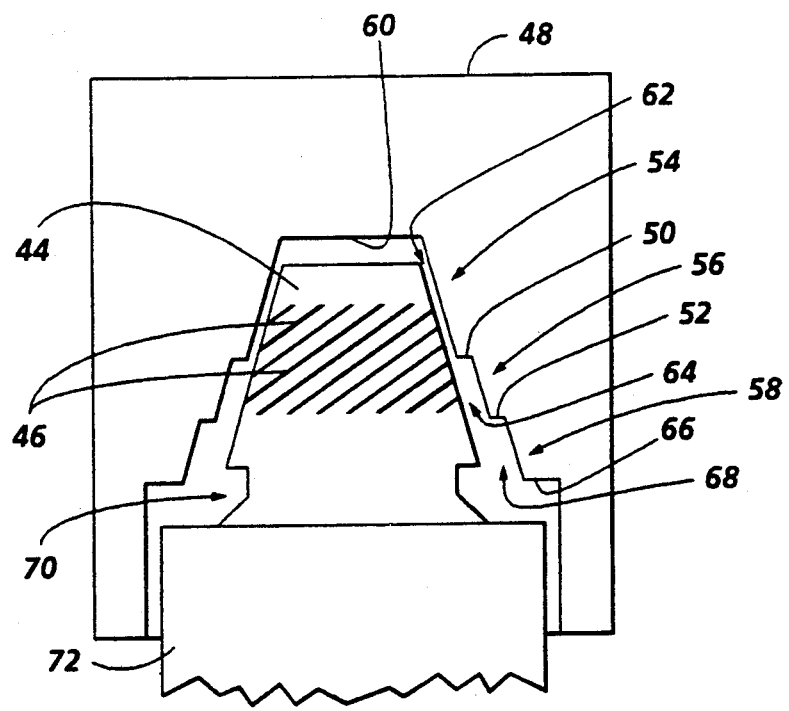
FIG. 3 is a schematic illustration of an alternate embodiment of the frusto-conical grooved grease bearings with a stepped bearing cup formed according to this invention.

In FIG. 3, grease bearing 44 with a series of grooves 46 and bearing cup 48 are of identical structure to those of optical scanner 10 of FIG. 1, except that the bearing cup is stepped. The bearing cup 48 has two circumferential steps 50 and 52 which divides the bearing cup into a lubricating region 54, a pumping region 56 and a reservoir region 58.

The lubricating region 54 is between the base 60 of the bearing cup and the first circumferential step 50. The space 62 between the bearing and the bearing cup at the lubricating region is where the hydrodynamic lubrication of the grease bearing occurs. Radial clearance is this region between the bearing and the bearing cup is approximately 12.5 microns (0.0005 inch).

The pumping region 56 is between the first circumferential step 50 of the bearing cup and the second circumferential step 52. The space 64 between the bearing and the bearing cup at the pumping region is where the grooves 46 on the bearing pump the grease back into the lubricating region 54 of the bearing cup. Radial clearance in this region between the bearing and the bearing cup is approximately 125 microns (0.005 inch).

The reservoir region 58 is between the second circumferential step 52 and the outer edge of the bearing cup 66. The space 68 between the bearing and the bearing cup at the reservoir region acts as a reservoir for the grease and an overflow area. Radial clearance in this region between the bearing and the bearing cup is approximately 500 microns (0.020 inch).

A circumferential groove 70 can be provided between the grease bearing 44 and the rotor 72 to prevent the grease from moving into the motor/polygon mirror assembly from the reservoir region. The pumping grooves 46 do not extend all the way through the bearing into the reservoir region and the groove 70 acts as a terminating point for the grease.

One inherent problem in the use of grease bearings is the impact upon performance of the grease bearing if too much or too little grease is installed during assembly of the bearing. A stepped bearing cup reduces the sensitivity of the bearing to grease volume variations by providing a narrower lubricating region with a pumping region to insure a constant supply of grease in the case of too little grease and an overflow reservoir region in the case of too much grease. This reduction in sensitivity to grease volume between the bearing and bearing cup will aid in the manufacture of the grease bearing.

Figure 4:
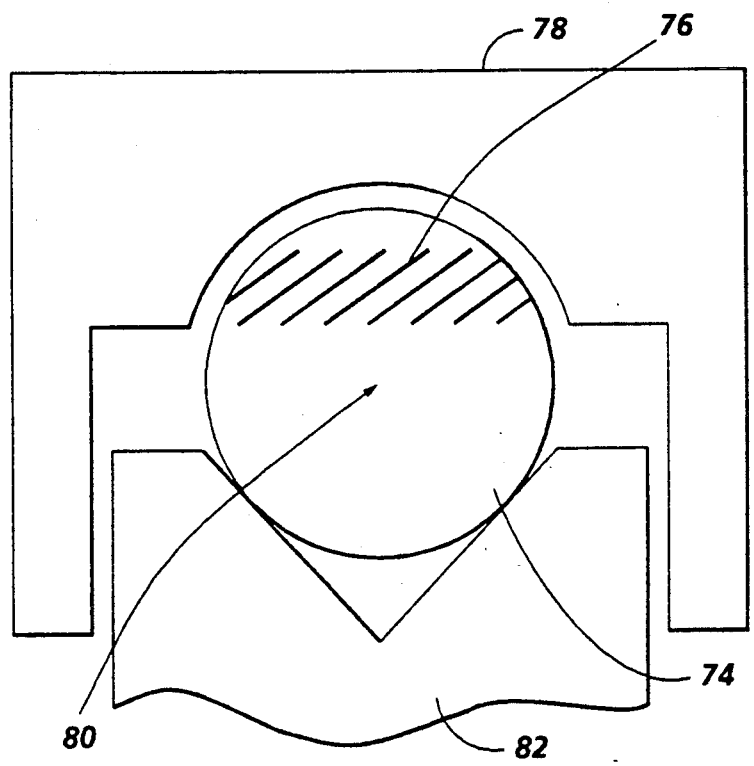
FIG. 4 is a schematic illustration of an alternate embodiment with spherical grooved grease bearings formed according to this invention.

In FIG. 4, grease bearing 74 with a series of grooves 76 and bearing cup 78 are of identical structure to those of optical scanner 10 of FIG. 1, except that the grease bearing and complementary bearing cup are spherical in shape, rather than frusto-conical.

The spherical grease bearing has certain advantages, even over the frusto-conical grease bearing. The spherical grease bearings are relatively insensitive to misalignment of the bearing cups with each other and still allow the rotor to rotate. Spherical grease bearings are even cheaper and simpler to manufacture than frusto-conical grease bearings.

The previous alternate embodiments of grooves on the bearing cup, rather than the bearing and stepping the bearing cup also apply to a spherical grease bearing.

In the case of a spherical grease bearing, it is preferable to have the grooves on the bearing cup for ease of manufacture. A small ball 80 from a conventional ball bearing can be attached to the rotor end 82 by adhesive or other means. The grooved spherical bearing cup is relatively simple to fabricate.

In an alternative to complementary bearing and bearing cup design, the frusto-conical grease bearing of FIG. 1 can be matched to a conical bearing cup or a conical grease bearing can be used with the conical bearing cup. The use of a conical grease bearing and conical cup does require more precise alignment, and is more sensitive to physical shocks and damage than the frusto-conical bearing with either shape bearing cup. The spherical grease bearing of FIG. 4 can also be matched with a frusto-conical or a conical bearing cup.

Figure 5:
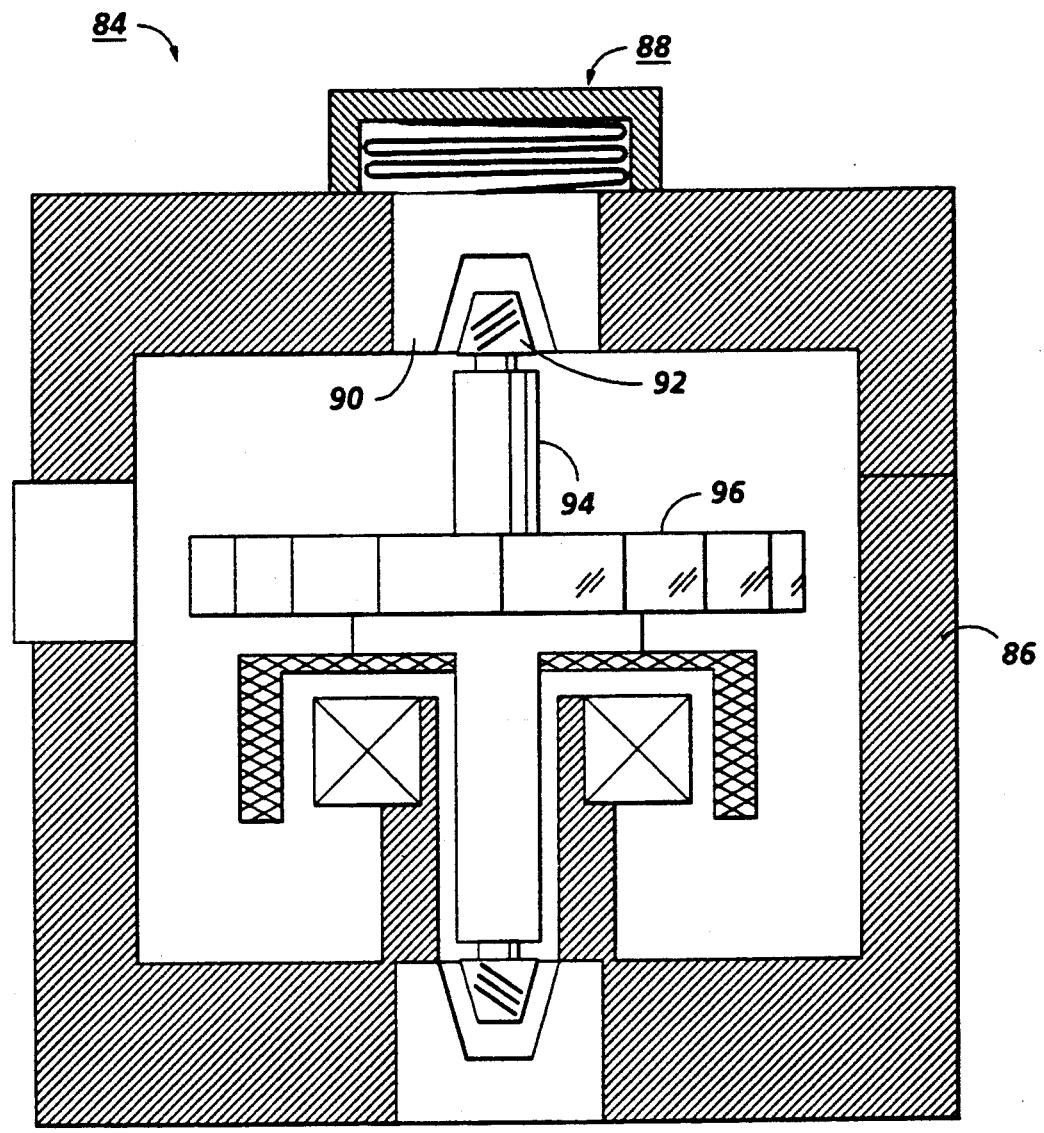
FIG. 5 is a schematic illustration of an alternate embodiment of an optical scanner with grease bearings and a spring pressured bearing cup formed according to this invention.

Reference is now made to FIG. 5 wherein there is disclosed an optical scanner 84 which is identical in structure to optical scanner 10 of FIG. 1, except that the scanner housing 86 has spring pressure means 88 to force the bearing cup 90 onto the grease bearing 92 and the rotor 94. The spring pressure means aids in alignment of the rotor and attached polygon mirror 96 and helps avoid damage due to physical shocks to the optical scanner. The hydrodynamic effect between the bearing and the bearing cup maintains the radial clearance, prevents static friction and prevents the two surfaces from being forced together such that the rotor can not rotate or can not rotate easily.

This embodiment requires that the bearing cup is not formed integral with the scanner housing and that bearing cup have free movement relative to the scanner housing along the axis of the rotor by lubrication or other means.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical scanner comprising:
   a scanner housing,
   a mirror assembly mounted on a rotor, said rotor and said mirror assembly being inside said scanner housing, said rotor having two opposed ends,
   magnetic means mounted on said rotor and stator means mounted on said scanner housing to form a motor to rotate said rotor and said mirror assembly, and
   a bearing at each end of said rotor, a bearing cup in said scanner housing opposing said bearing, grease between said bearing and said bearing cup, groove means on either said bearing or said opposing bearing cup or both, such that said groove means keeps said grease between said bearing and said bearing cup when said rotor is rotating from 15,000 to 35,000 RPM and said grease remains between bearing and said bearing cup when said rotor is not rotating due to the thixotropic property of said grease.

2. The optical scanner of claim 1 wherein said groove means on said bearing is a series of grooves.

3. The optical scanner of claim 2 wherein said bearing is frusto-conical in shape.

4. The optical scanner of claim 3 wherein said bearing cup is frusto-conical in shape, complementary to said bearing.

5. The optical scanner of claim 2 wherein said bearing is spherical in shape.

6. The optical scanner of claim 5 wherein said bearing cup is spherical in shape, complementary to said bearing.

7. The optical scanner of claim 1 wherein said groove means on said bearing is a spiral-shaped groove.

8. The optical scanner of claim 1 wherein said bearing cup is stepped.

9. The optical scanner of claim 8 wherein said stepped bearing cup has a first and second circumferential grooves dividing the surface of the bearing cup into a first, second, and third regions, each of said regions having a different radial clearance between said bearing and said bearing cup.

10. The optical scanner of claim 9 wherein said radial clearances of said regions are progressively larger for each of said regions away from the base of said bearing cup.

11. The optical scanner of claim 10 wherein
    said first region between said base of said bearing cup and said first circumferential groove primarily lubricates with said grease between said bearing and said bearing cup,
    said second region between said first and said second circumferential grooves primarily pumps said grease keeping said grease between said bearing and said bearing cup when said rotor is rotating, and
    said third region between said second circumferential groove and an edge of said bearing cup primarily stores said grease.

12. The optical scanner of claim 11 wherein a circumferential groove is between said bearing and said rotor.

13. The optical scanner of claim 1 wherein said scanner housing has pressure means to force at least one of said bearing cups onto at least one of opposing bearings.

14. The optical scanner of claim 13 wherein said pressure means is a spring.

15. The optical scanner of claim 1 wherein said groove means on said bearing cup is a series of grooves.

16. The optical scanner of claim 1 wherein said groove means on said bearing cup is a spiral-shaped groove.

* * * * *